US 6,597,866 B2

(12) United States Patent
Uchida et al.

(10) Patent No.: US 6,597,866 B2
(45) Date of Patent: Jul. 22, 2003

(54) CAMERA FOR TAKING A PICTURE IN A GOOD FOCUS CONDITION

(75) Inventors: Mitsuhiro Uchida, Kanagawa (JP); Norihiro Oomae, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/180,304

(22) Filed: Jun. 27, 2002

(65) Prior Publication Data

US 2003/0002868 A1 Jan. 2, 2003

(30) Foreign Application Priority Data

Jul. 2, 2001 (JP) ......................... 2001-201264

(51) Int. Cl.[7] .................. G03B 7/097; G03B 13/32; G03B 15/05
(52) U.S. Cl. .................. 396/103; 396/161; 396/168; 396/242
(58) Field of Search .................. 396/89, 103, 159, 396/161, 168, 242, 166

(56) References Cited

U.S. PATENT DOCUMENTS 6,477,325 B1 * 11/2002 Tobioka .................. 396/103 X

* cited by examiner

*Primary Examiner*—W. B. Perkey
(74) *Attorney, Agent, or Firm*—Sughrue Mion, PLLC

(57) ABSTRACT

A camera uses a program shutter as a shutter device. When an exposure value becomes larger than EV9, a stop of the camera is closed down so as to increase an f-number. In a case that the camera is loaded with a photographic film having film sensitivity of ISO 1000 or more, an upper limit of a focus set position of a taking lens is fixed to 3 m. By utilizing a depth of field, a picture is taken in a state that a blur is reduced, relative to a subject existing within a range from a comparatively short photographic-distance to a far photographic-distance.

13 Claims, 11 Drawing Sheets

CAMERA FOR TAKING A PICTURE IN A GOOD FOCUS CONDITION

BACKGROUND OF THE INVENTION

1. Field of the Invention

The present invention relates to a camera for taking a picture in a good focus condition.

2. Description of the Related Art

In recent years, technology regarding a photographic film is improved so that the photographic film is adapted to have high sensitivity without deteriorating image quality. The photographic films of ISO 1000 and ISO 1600, for instance, tend to be used in general. When this kind of photographic film having high sensitivity is used in a room and at the midnight outdoors, it is possible to take a picture in proper brightness, whereas the background thereof becomes dark on another photographic film having comparatively low sensitivity. For example, when a picture is taken on condition that f-number of an exposure aperture of a camera is F4, proper exposure is obtained relative to subject brightness of BV0 by combining with a shutter speed of 1/30 sec and by using the photographic film having film sensitivity of ISO 1600. Thus, an exposure amount is properly obtained relative to the background in a photographic scene of general room lighting and in a photographic scene having the background of a bright night view.

Most of the currently-sold cameras comprise an automatic exposure mechanism (AE mechanism) and an autofocus mechanism. In a compact camera comprising the AE mechanism, the f-number and the shutter speed are determined so as to correspond to a proper exposure value, which is determined on the basis of measured subject brightness and sensitivity of the loaded photographic film. Many compact cameras use a program shutter controlling the exposure amount in accordance with the determined f-number and shutter speed.

Although there are various programs used for the program shutter, many compact cameras adopt a program shifting the shutter speed to a high-speed side. FIG. 12 shows an example of this kind of program. Such as shown in FIG. 12, as the exposure value (EV) becomes large, the shutter speed is gradually shifted to the high-speed side, keeping the f-number of the aperture (F4 in FIG. 12). When the shutter speed becomes high (1/250 sec in FIG. 12), the shutter speed is shifted to the high-speed side, increasing the f-number to close down a stop. The reason for adopting such a program is that camera-shake is prevented from occurring when using a telephoto lens or the like.

The camera including the autofocus mechanism is provided with a measurement area, which is normally arranged at a central portion of a picture to be taken, to measure a distance to a subject existing in the measurement area. A projection amount of a taking lens is adjusted so as to automatically bring the measured distance into focus.

By the way, when using the high-sensitivity photographic film having the film sensitivity of ISO 1000 and ISO 1600, the exposure is performed within an exposure control range of the general compact camera so that it is possible to obtain a proper exposure amount. In a case of the program shutter shown in FIG. 12, the proper exposure amount is about EV9 to EV13 upon using the photographic film of ISO 1600 when a picture is taken inside a room of which subject brightness is about BV0 to BV4. In this case, although the proper exposure amount is obtained, a depth of field becomes shallow, since the f-number of the aperture is used. Accordingly, there arises a problem in that all of the taken pictures have great blur with respect to the background, whereas the main subject is brought into focus.

Further, when the autofocus mechanism of the camera is used for taking a picture, photographing is mistakenly performed if the measurement area is not set to the main subject at the time of framing. In this case, the main subject is not brought into focus, but the background is brought into focus.

SUMMARY OF THE INVENTION

In view of the foregoing, it is a primary object of the present invention to provide a camera in which it is possible to take a picture in a good focus condition.

It is a second object of the present invention to provide a camera in which a main subject of a short distance and the background thereof are photographed in a good focus condition even if photographing is performed in a room.

In order to achieve the above and other objects, the camera according to the present invention comprises a program shutter and a focal-position controller limiting a length for focusing within a range of 3 m or less. In the program shutter, a combination of a shutter speed and an f-number corresponding to each exposure value is determined so as to satisfying the following condition:

$$0.5 \leq (AV11-AV9)/(TV11-TV9) \leq 2.0 \quad (1)$$

wherein AV9 denotes an apex value of the f-number which is set when the exposure value is EV9, and TV9 denotes an apex value of the shutter speed at that time. Further, AV11 denotes the apex value of the f-number which is set when the exposure value is EV11, and TV11 denotes the apex value of the shutter speed at that time.

In another embodiment, the camera according to the present invention comprises a program shutter and a taking lens of a fixed-focus type in which a length for focusing is set within a range of 1.0 m to 3.0 m. In the program shutter, the combination of the shutter speed and the f-number corresponding to each exposure value is determined so as to satisfying the foregoing condition (1).

In the present invention, a program of the program shutter is adapted to satisfy the forgoing condition (1). At the same time, when film sensitivity is ISO 1000 or more, the length for focusing is limited within a range of 3 m or less. Owing to this, when a photographic film of ISO 1000 or more is used, a main subject of a short distance and the background thereof can be photographed in a good focus condition even in a photographic environment of a room and so forth. Further, in the case that the taking lens of the fixed-focus type is used, the length for focusing is set within the range of 1.0 m to 3.0 m so that a main subject of a short distance and the background thereof can be photographed in a good focus condition even in a photographic environment of a room and so forth.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT (S)

Figure 1:
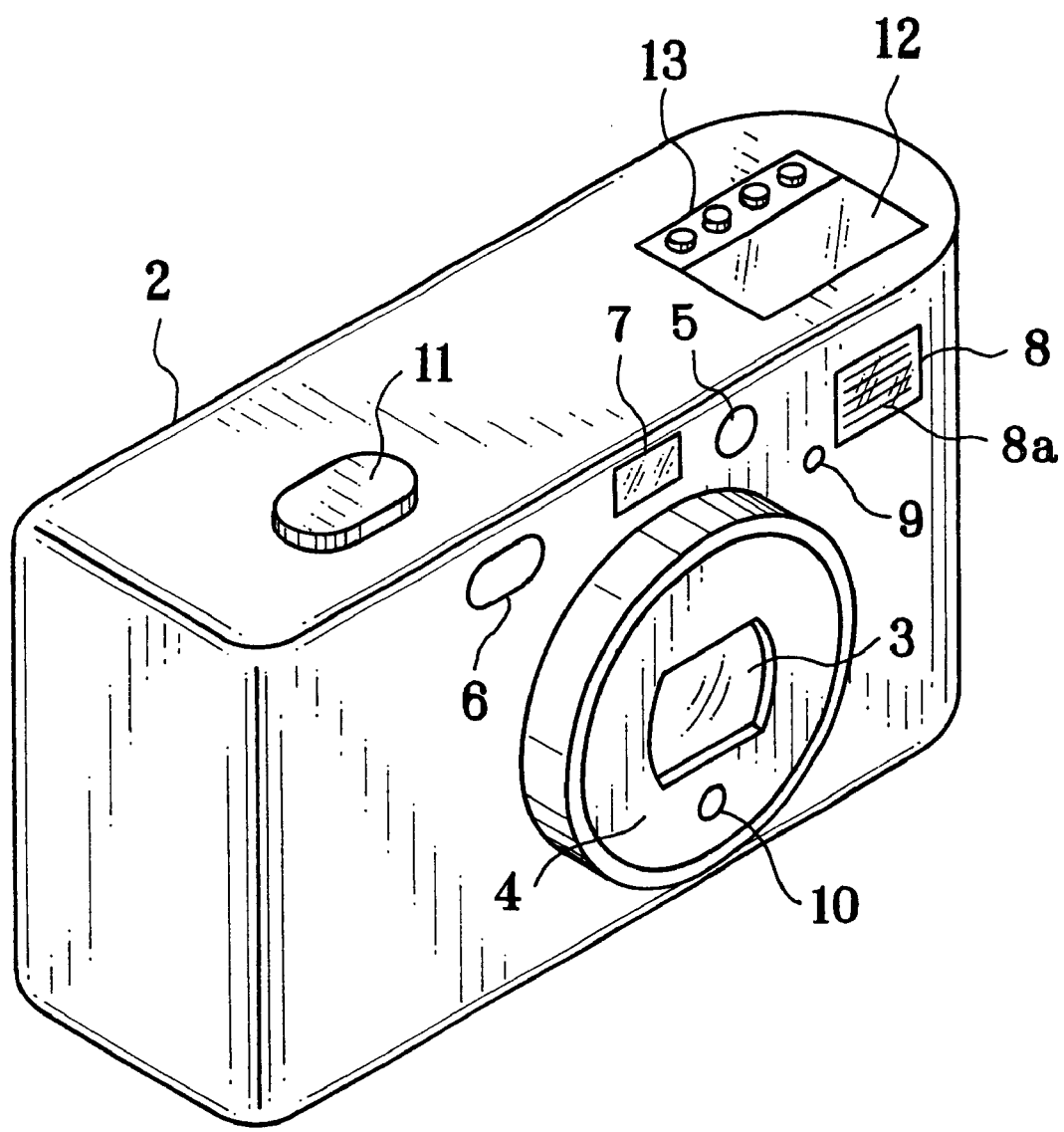
FIG. 1 is a perspective view showing a camera according to the present invention.

A camera according to the present invention is shown in FIG. 1. The front of a camera body 2 is provided with a lens barrel 4 for holding a taking lens 3, light emitting and receiving windows 5 and 6 for measuring a distance, a viewfinder 7, a flash portion 8, and a light-regulation window 9. Further, a front side of the lens barrel 4 is provided with a photometry window 10. Upon turning on a main switch of the camera, the lens barrel 4 projects from a collapsible-mount position, which is shown in FIG. 1, to a photographing position.

A top face of the camera body 2 is provided with a release button 11, a liquid-crystal panel 12, and an operational portion 13. The liquid-crystal panel 12 displays a residual number of photographable frames and a flash mode. By operating the operational portion 13, the main switch and a self-timer are tuned on and off, and a flash mode is selected, for instance.

As to the flash mode, it is possible to select one of an automatic flash mode, a flash compulsion mode, and a flash prohibition mode. In the automatic flash mode, the flash light is automatically emitted when subject brightness is low. In the flash compulsion mode, the flash light is emitted without regard to the subject brightness. In the flash prohibition mode, emitting the flash light is prohibited. In the camera of the present embodiment, when photographing is performed with the flash light, an exposure value is determined in accordance with the measured subject brightness. In other words, a combination of an f-number and a shutter speed is determined in accordance with the measured subject brightness. At the same time, with respect to a main subject of comparatively short distance, exposure amounts of the main subject and the background are adjusted so as to become proper by controlling a flash-light amount.

A light emitting unit for emitting a light toward a subject is disposed behind the light emitting window 5. Moreover, a light receiving unit for receiving the light reflected from the subject is disposed behind the light receiving window 6. Further, a light-regulation sensor 14 (see FIG. 2) and a light receiving element used for photometry are disposed behind the light-regulation window 9 and the photometry window 10 respectively. The light-regulation sensor 14 receives the flash light reflected from the subject. The light receiving element for photometry measures the subject brightness. The lens barrel 4 contains a shutter device 15 (see FIG. 2) being as a lens shutter, together with the taking lens 3. The shutter device 15 comprises a shutter blade, which is also used as a stop blade. The shutter device 15 is a program shutter performing an opening-and-closing operation in accordance with the f-number and the shutter speed, which are determined so as to correspond to the determined exposure value.

Upon depressing the release button 11 by a half stroke, the light emitting unit for measuring the distance emits the light to the subject through the light emitting window 5. By receiving the reflected light with the light receiving unit through the light receiving window 6, is measured a photographic distance of the subject positioned within a measurement area, which is set at a central portion of a picture to be taken. Meanwhile, the light receiving element for photometry measures the subject brightness through the photometry window 10 by means of averaged light metering.

Successively, when the release button 11 is fully depressed, a focusing operation of the taking lens 3 is performed. After that, the shutter device 15 is actuated in accordance with the f-number and the shutter speed, which correspond to the exposure value calculated on the basis of the measured subject brightness and film sensitivity, to take a picture.

The flash portion 8 comprises a diffusion plate 8a, a flash discharge tube (Xe tube) 16 (see FIG. 2) disposed behind the diffusion plate 8a, and so forth. The flash discharge tube 16 radiates the flash light, and the diffusion plate 8a diffuses the flash light in a predetermined radiation pattern. After the flash light has been emitted, the flash light reflected from the subject is received by the light-regulation sensor 14 to integrate the light amount. When an integral value of the light amount reaches a predetermined level, emitting the flash light is stopped. In this way, the exposure amount of the main subject, which is obtained by using the flash light, is controlled so as to become proper.

The camera body 2 is provided with a film lid (not shown). By opening the film lid, a photographic film is contained and is drawn out. As to the photographic film, the 135 type is contained, for instance. However, an IX240 type of Advanced Photo System (APS) may be contained.

Upon containing the photographic film, the film sensitivity thereof is automatically inputted into the camera and is set by a mechanism incorporated in the camera. In the case of the 135-type photographic film, a DX code provided on a cassette of the photographic film is read when the film sensitivity is inputted into the camera. In the case of the IX240-type photographic film, a bar code provided on a data disk is read. The data disk is rotatably disposed in a cartridge together with a spool. Of course, the film sensitivity may be manually inputted.

Figure 2:
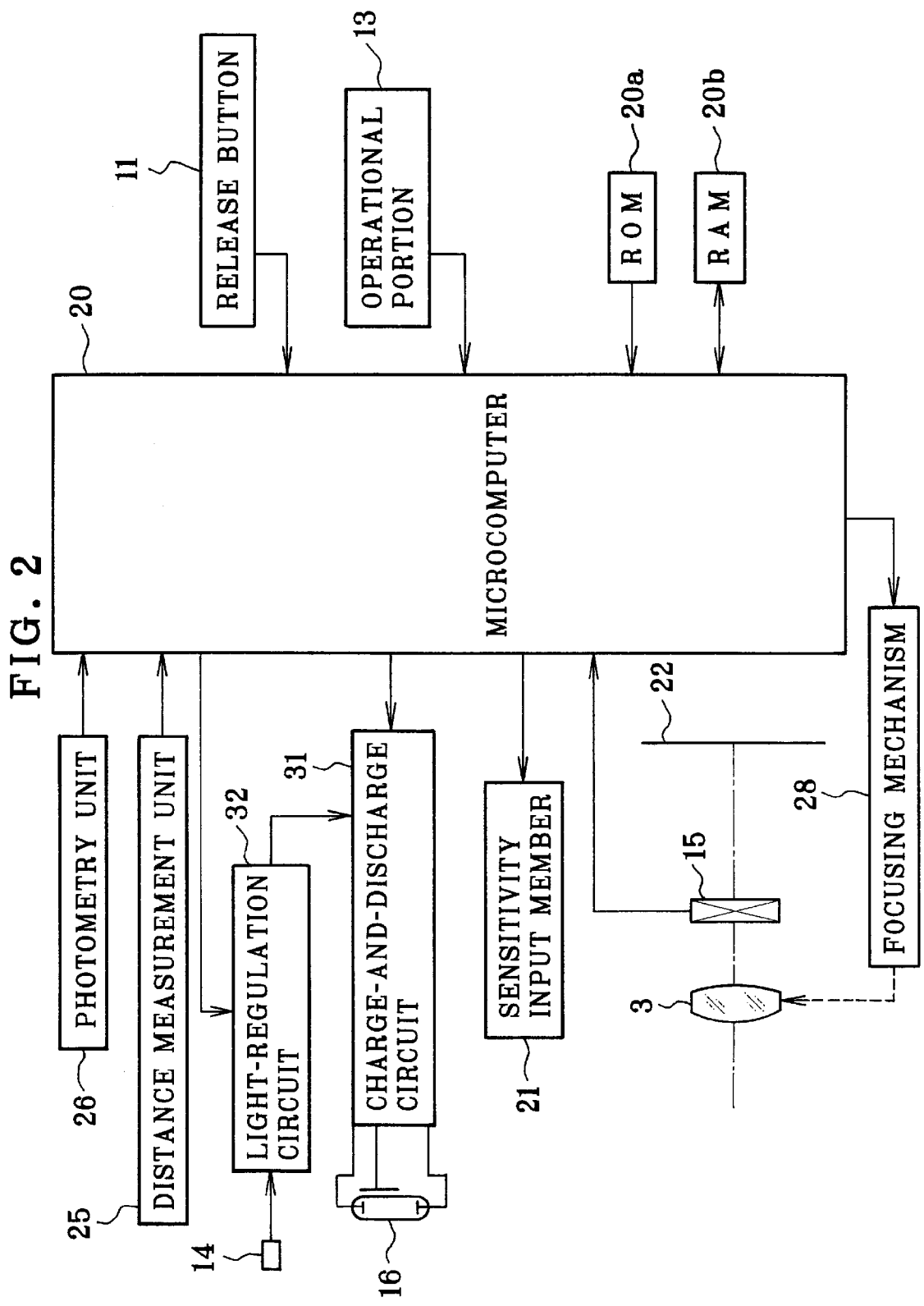
FIG. 2 is a block diagram partially showing a structure of the camera.

FIG. 2 partially shows a structure of the camera. A microcomputer 20 comprises a CPU and various interface circuits, all of which are unified in one chip. The microcomputer 20 is connected to a ROM 20a and a RAM 20b. The ROM 20a stores a program for executing a photographic sequence. This program includes a control program according to the present invention, and along this program, the microcomputer 20 controls each section of the camera. The RAM 20b is used as a work memory for temporarily storing the film sensitivity, which is inputted from a sensitivity input member 21, and various data required for executing the photographic sequence.

The sensitivity input member 21 is for distinguishing and inputting the film sensitivity. The sensitivity input member 21 electrically reads the DX code provided on the cassette of the photographic film 22. Incidentally, when the IX240-type photographic film is used, the sensitivity input member 21 is a bar-code sensor for photoelectrically reading the bar code of the data disk. In the case that the film sensitivity is manually inputted, the sensitivity input member 21 is constituted of a switch or the like externally operated.

The shutter device 15 is the program shutter comprising the shutter blade, which is also used as the stop blade, such as mentioned above. The microcomputer 20 sets the exposure value to the shutter device 15. When a shutter drive signal is inputted from the microcomputer 20 in response to the full depression of the release button 11, the shutter device 15 opens the shutter to expose the photographic film 22 with the set exposure value.

In response to the shutter drive signal, the shutter device 15 moves the shutter blade in an open direction. In doing so, a diameter of a stop aperture formed by the shutter blade is gradually increased up to a diameter corresponding to the f-number (hereinafter called as set f-number), which is solely determined in accordance with the set exposure value. When the diameter of the stop aperture reaches the diameter corresponding to the set f-number, the shutter device 15 keeps the current state for a period corresponding to the shutter speed. After that, the shutter blade is moved in a closed direction, which is the backward direction to the open direction. Thus, the diameter of the stop aperture is gradually decreased and the stop aperture is finally closed.

In the shutter device 15, for the purpose of making a depth of field deep from a stage of the small exposure value, a combination of the f-number and the shutter speed (hereinafter called as program), which corresponds to each exposure value, is predetermined such that the f-number becomes small from the stage of the small exposure value.

Concretely, the shutter device 15 has the program in that the f-number is larger than the f-number of an exposure aperture when the exposure value is larger than EV11. Thus, in the case of this program, photographing is performed in a state that the stop is closed down. This kind of program satisfies the following condition:

$$0.5 \leq (AV11-AV9)/(TV11-TV9) \leq 2.0$$

wherein AV9 denotes an apex value of the f-number (AV value) corresponding to EV9, TV9 denotes an apex value of the shutter speed (TV value) corresponding thereto, AV11 denotes the apex value of the f-number corresponding to EV11, and TV11 denotes the apex value of the shutter speed corresponding thereto. Incidentally, it is preferable to satisfy the following condition.

$$0.7 \leq (AV11-AV9)/(TV11-TV9) \leq 1.5$$

Figure 3:
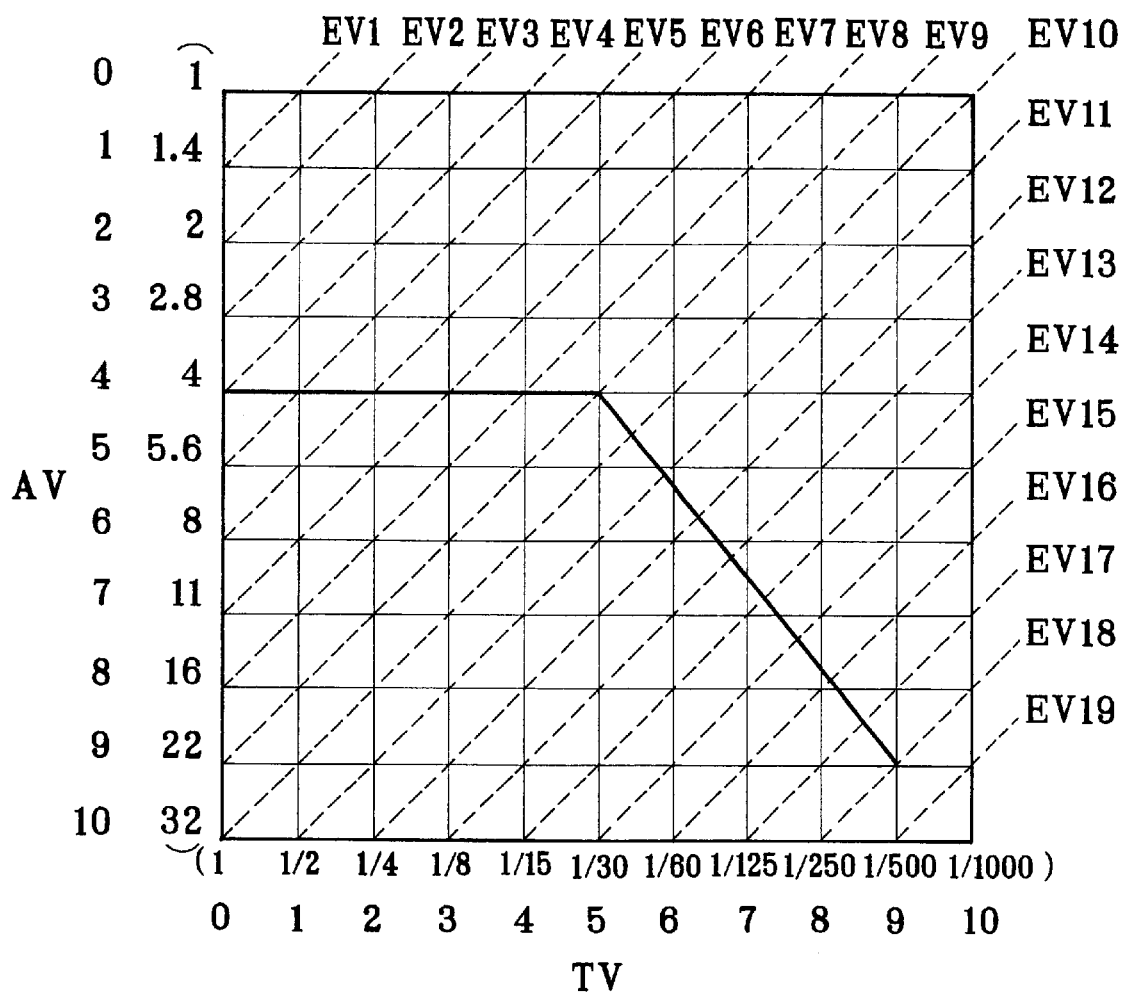
FIG. 3 is a program diagram of a shutter device built in the camera.

FIG. 3 is a program diagram showing an example of the program of the shutter device 15 used in the camera. In FIG. 3, a vertical line and a horizontal line represent the AV value and the TV value respectively, further, the f-number and the shutter speed corresponding thereto are respectively entered as well. The shutter device 15 is capable of controlling the exposure within a range of EV4 to EV18. The aperture f-number F4 and the shutter speed "1 sec" are combined at the time of EV4. As the exposure value increases from EV4, the shutter speed is shifted to a high-speed side in the state that the f-number is kept at the aperture f-number F4. After exceeding EV9, the stop is gradually closed down from the aperture f-number F4. Simultaneously, the shutter speed is shifted to the high-speed side. At the time of EV18, the minimum f-number F22 and the shutter speed "1/500 sec" are combined.

In the shutter device 15, the f-number AV9 and the shutter speed TV9 corresponding to EV9 are "4" (F4) and "5" (1/30 sec) respectively. Moreover, the f-number AV11 and the shutter speed TV11 corresponding to EV11 are about "5.1" and about "5.9" respectively. Upon calculation with accurate values of AV11 and TV11, a value of "(AV11−AV9)/(TV11−TV9)" is "1.25" so that the foregoing condition is satisfied.

Figure 4A:
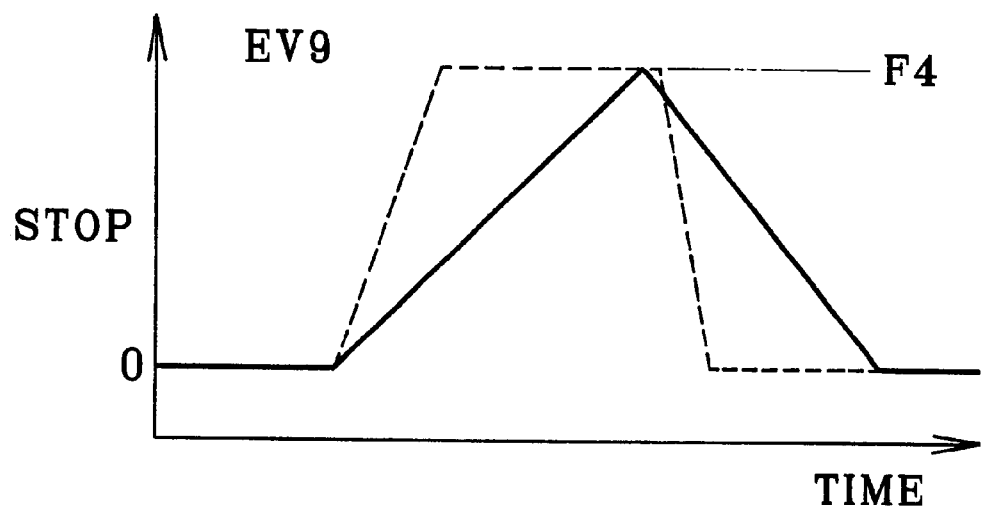
FIGS. 4A and 4B are graphs showing stop changes of the shutter device in conditions of EV9 and EV11 respectively.
Figure 4B:
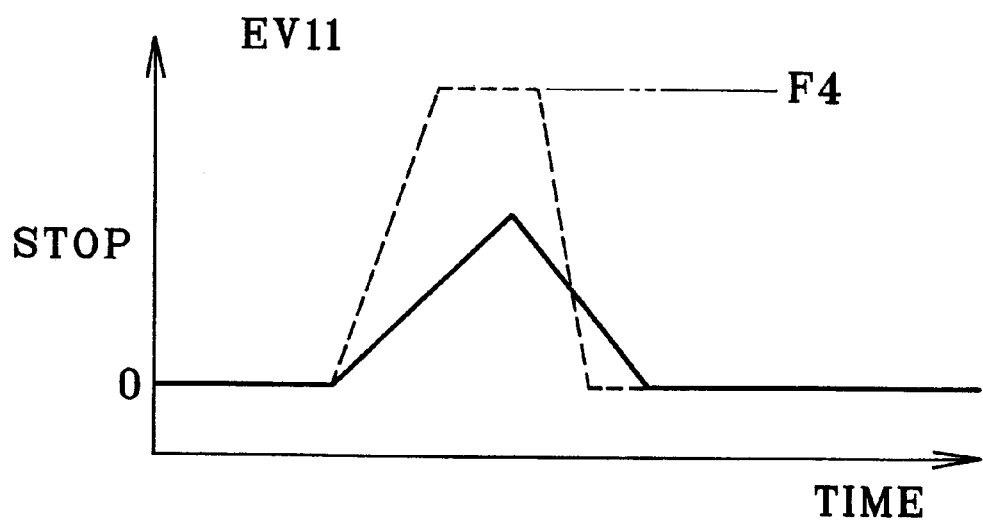

As to a method for carrying out the program shown in FIG. 3, it is easily performed to slow down an operation speed of a shutter blade employed in a conventional shutter device. In this case, a size of the stop aperture is changed such as shown in FIG. 4A when the exposure value is EV9, and is changed such as shown in FIG. 4B when the exposure value is EV11. In FIGS. 4A and 4B, the size of the stop aperture changes so as to be shown by a broken line of the respective drawings before the operation speed of the shutter blade is slowed down.

The shutter device 15 generates synchro signals at the time of the predetermined f-number, which is more closed dawn than the aperture f-number, and at the time of the set f-number. If the predetermined f-number is equal to the set f-number, the sole synchro signal is generated. The synchro signal from the shutter device 15 is sent to the microcomputer 20 and is used for controlling flash timing. In this embodiment, the predetermined f-number is set to F11.

In FIG. 2, the microcomputer 20 activates a distance measurement unit 25 and a photometry unit 26 when the release button 11 is depressed by a half stroke. The distance measurement unit 25 includes a light-emitting device and a light-receiving device to measure a photographic distance of a subject arranged at a central portion of a picture to be taken. The photometry unit 26 includes a light-receiving element for photometry to measure subject brightness of a photographic area. Information concerning the photographic distance obtained by the distance measurement unit 25 is transferred to the microcomputer 20. Moreover, information concerning the subject brightness obtained by the photometry unit 26 is also transferred to the microcomputer 20.

The microcomputer 20 calculates the proper exposure value from the obtained subject brightness and the film sensitivity of the loaded photographic film 22. The calculated exposure value is set to the shutter device 15. If the automatic flash mode is selected, whether the flash light is emitted or not is determined in accordance with the measured subject brightness.

A focusing mechanism 28 is constituted of a motor and a drive circuit to adjust a projection amount of the taking lens 3. The focusing mechanism 28 is controlled by the microcomputer 20. When the film sensitivity of the loaded photographic film 22 is less than ISO 1000, the microcomputer 20 controls the focusing mechanism 28 to adjust the projection amount of the taking lens 3 such that the focus is set to the photographic distance based on the information obtained from the distance measurement unit 25.

Meanwhile, when the film sensitivity of the loaded photographic film 22 is ISO 1000 or more, a length to which the focus is set is limited to 3 m or less by the microcomputer 20. This length is called as, "focus set position", hereinafter. In other words, when the photographic distance measured by the distance measurement unit 25 is 3 m or less, the projection amount of the taking lens 3 is adjusted so as to set the focus to the photographic distance based on the information, which is obtained from the distance measurement unit 25, similarly to the case in that the film sensitivity is less than the ISO 1000. However, when the photographic distance exceeds 3 m, the focusing mechanism 28 adjusts the projection amount of the taking lens 3 so as to set the focus to a subject, the photographic distance of which is 3 m, regardless of the photographic distance measured by the distance measurement unit 25. By the way, in the present embodiment, the upper limit of the focus set position is 3 m when the film sensitivity is ISO 1000 or more. This upper limit, however, may be less than 3 m.

The camera employs the shutter device 15 adopting the above-mentioned program. Owing to this, when using the photographic film having high sensitivity, the depth of field becomes deep by closing down the stop more than the aperture f-number, even if photographing is performed in a room. When the film sensitivity is ISO 1000 or more, the upper limit of the focus set position is 3 m as stated above. Thus, even if a picture is taken in a room, the focus set position and the f-number are combined so as to take the picture in good focus condition relative to both of the short-distance main subject and the comparatively-separated background. In other words, the depth of field is elongated by closing down the stop, and at the same time, a distance range included in the depth of field is properly set by limiting the focus set position within a proper range. In virtue of this, a blur of the subject is reduced as small as possible from the comparatively-short distance to the infinity.

When the film sensitivity is ISO 1000 or more, the range of the focus set position is restricted such as described above. Thus, it is prevented to mistakenly take a picture, in which the focus is not adjusted to the main subject but is adjusted to the background, when the measurement area of the picture to be taken is shifted from the main subject at the time of framing.

A flash device is an automatic type, which comprises a charge-and-discharge circuit 31 and a light-regulation circuit 32 besides the light-regulation sensor 14 and the flash discharge tube 16, which are respectively disposed behind the light-regulation window 9 and inside the flash portion 8. The charge-and-discharge circuit 31 charges a main capacitor (not shown) up to a predetermined level when the main switch of the camera is turned on. The microcomputer 20 inputs a flash start signal into the charge-and-discharge circuit 31 when the flash light is emitted. Upon inputting the flash start signal, the charge-and-discharge circuit 31 applies a trigger voltage to the flash discharge tube 16 so that an electric charge of the main capacitor is discharged in the flash discharge tube 16 to start the emission of the flash light. Incidentally, when the flash is used, the shutter speed is limited so as to be faster than "1/30 sec" for the purpose of preventing camera movement blur.

The light-regulation sensor 14 receives the flash light reflected by the subject during the emission of the flash light. Further, the light-regulation sensor 14 lets a photoelectric current flow in accordance with an amount of the received light. The light-regulation circuit 32 integrates the amount of the reflected flash light received by the light-regulation sensor 14, on the basis of the photoelectric current flowing from the light-regulation sensor 14. When the integrated amount has reached a predetermined stop level, the charge-and-discharge circuit 31 is controlled to stop the flash light.

Figure 5:
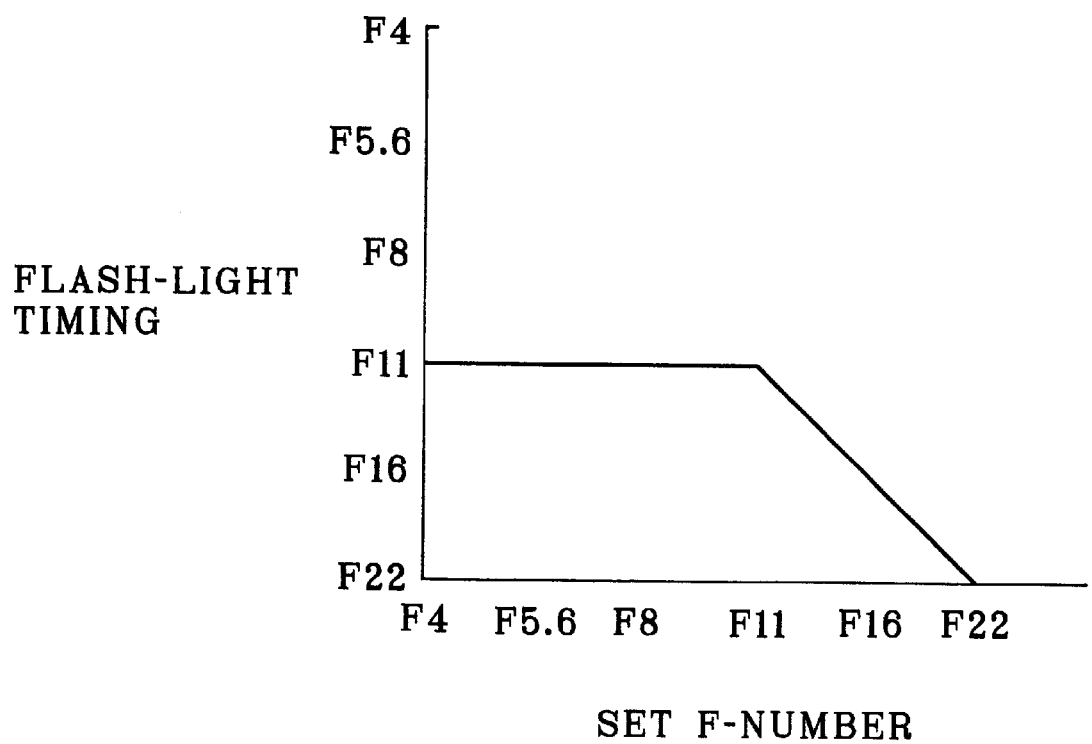
FIG. 5 is a graph showing a relationship between a set f-number and flash-light timing.

When the subject brightness is low under the automatic flash mode or when the flash compulsion mode is selected, the flash start signal is sent to the charge-and-discharge circuit 31 at the moment that the first synchro signal is inputted from the shutter device 15. As described above, the synchro signals are generated when the diameter of the stop aperture formed by the shutter blade corresponds to each of the predetermined f-number (F11) and the set f-number. As shown in FIG. 5, in the case that the set f-number is within a range of F4 to F11, the flash light is emitted when the diameter of the stop aperture corresponds to the f-number F11. In the case that the set f-number exceeds F11, the flash light is emitted when the diameter of the stop aperture corresponds to the set f-number currently preserved.

As described above, in the camera according to the present invention, the flash light is emitted in the state that the f-number is more closed than the f-number of the aperture. Owing to this, the depth of field is deepened at the time of flash photographing so that it is reduced to photograph an unfocused main subject.

The flash stop level is determined by the microcomputer 20 and is set to the light-regulation circuit 32. The microcomputer 20 calculates the flash stop level so as to make the exposure amount proper. The flash stop level is calculated on the basis of the f-number for the flash photographing and the film sensitivity of the photographic film 22.

Next, an operation of the above structure is described below. A photographer turns on the main switch with the operational portion 13 to set a photographable state when taking a picture. Further, the photographer selects the flash mode, if necessary. After that, the photographer determines the framing through the viewfinder 7, and depresses the release button 11.

Figure 6:
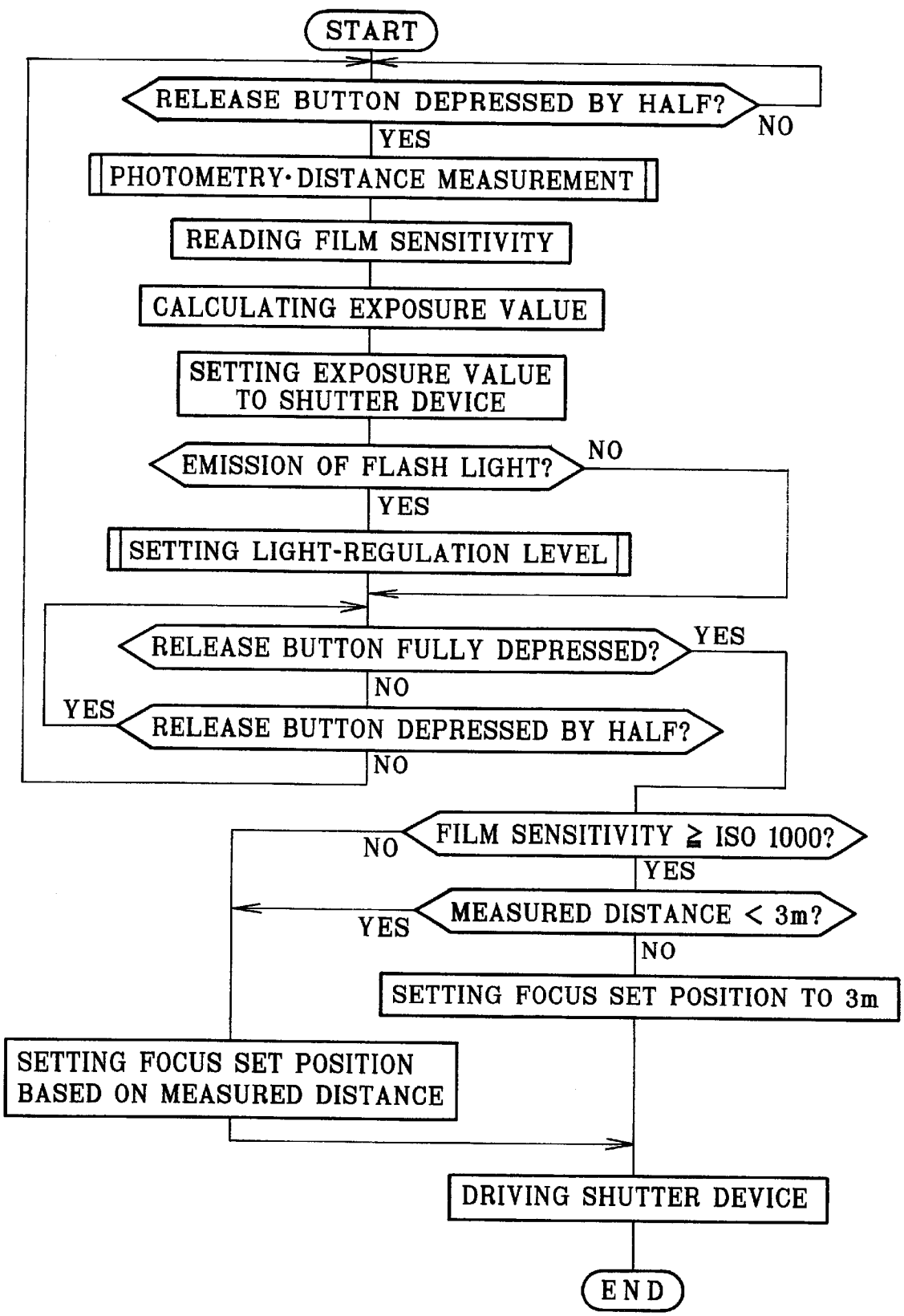
FIG. 6 is a flow chart showing a photographing sequence.

As shown in FIG. 6, upon depressing the release button 11 by a half stroke, the distance measurement unit 25 and the photometry unit 26 are activated. The distance measurement unit 25 measures the photographic distance of the central subject of the picture to be taken. The photometry unit 26 measures the subject brightness of the whole of the picture to be taken. The information concerning the photographic distance and the subject brightness are transferred to the microcomputer 20.

After receiving the information concerning the photographic distance and the subject brightness, the microcomputer 20 accesses the RAM 20b to read the film sensitivity of the loaded photographic film 22. Then, the microcomputer 20 calculates the exposure value corresponding to the proper exposure amount, on the basis of the film sensitivity and the subject brightness transferred from the photometry unit 26. The calculated exposure value is set to the shutter device 15.

Successively, whether the flash light is emitted or not is confirmed. When the flash light is not emitted, namely when the subject brightness is high under the automatic flash mode or when the flash prohibition mode is selected, the microcomputer 20 waits until the release button 11 is fully depressed.

When the release button 11 is fully depressed, the microcomputer 20 drives the focusing mechanism 28 to adjust the projection amount of the taking lens 3. At this time, the microcomputer 20 checks the film sensitivity of the photographic film 22 previously obtained by accessing the RAM 20b. When the film sensitivity is less than ISO 1000 or when the film sensitivity is ISO 1000 or more and the photographic distance is 3 m or less, the distance of the photographic-distance information is dealt with as the focus set position. However, when the film sensitivity is ISO 1000 or more and the photographic distance is 3 m or more, the focus set position is regarded as 3 m.

In this way, the taking lens 3 is moved by the focusing mechanism 28 under the control of the microcomputer 20 to adjust the projection amount of the taking lens 3 such that the focus is set to the subject distance determined on the basis of the film sensitivity of the photographic film 22 and the measured photographic distance.

After adjusting the projection amount of the taking lens 3, the shutter drive signal is sent from the microcomputer 20 to the shutter device 15. In response to the shutter drive signal, the shutter device 15 is driven. The shutter blade is moved in the open direction so that the diameter of the stop aperture gradually increases up to the diameter corresponding to the set f-number. This diameter is kept during the period corresponding to the shutter speed. Then, the diameter of the stop aperture is gradually decreased and is closed. In the present embodiment, when the exposure value is EV9 or more bright, namely when the shutter speed is 1/30 sec or more fast, the decrement operation of the stop-aperture diameter is started at the moment that the diameter has reached the stop diameter corresponding to the set f-number.

While the stop aperture is formed by opening and closing the shutter device 15, the photographic light of the available light enters the photographic film 22 from the taking lens 3 through the stop aperture so that the photographic film 22 is exposed.

In the case that the picture is taken by using the photographic film having high sensitivity of ISO 1000 or more, the focus set position is adjusted to 3 m when the main-subject distance is more than 3 m. In this case, the main subject is not brought into focus perfectly. However, the used shutter device 16 is programmed so as to be closed down from the stage in that the exposure value is comparatively small. Thus, even in a comparatively dark condition, for example in a room, the depth of field becomes deep since the picture is taken with the large f-number. Further, the focus set position is adjusted to 3 m so that the focusing range substantially exists near the photographic distance of 3 m. In other words, the depth of field substantially exists near the photographic distance of 3 m. As to this range, a rear side thereof is broader than a front side (camera side) thereof. Owing to this, the subject is photographed from 3 m to the infinity in a focus state substantially having no problems.

Even if photographing is performed in a state that the background is mistakenly regarded as a main subject when the focus should be set to the main subject of comparatively short distance, it is prevented to cause a failure in that the focus is set to only the background, since the picture is taken in the focus state having no problems from the short distance to the long distance, as described in the above.

In the meantime, in the case that the flash light is emitted when the subject brightness is low under the automatic flash mode or when the flash compulsion mode is selected, a light-level setting process is executed by the microcomputer 20 after setting the exposure value to the shutter device 15. In the light-level setting process, when the set f-number corresponding to the exposure value, which is determined on the basis of the subject brightness and the film sensitivity, is F11 or less, the flash stop level is determined by using the film sensitivity of the loaded photographic film 22 and the f-number F11 such that the proper exposure amount is obtained for the loaded photographic film 22 when the flash light is emitted on condition that the f-number is F11.

In contrast, when the set f-number is more than F11, the flash stop level is determined by using the current set f-number and the film sensitivity of the photographic film 22 such that the proper exposure amount is obtained for the photographic film 22 when the flash light is emitted on condition of the current set f-number.

After the flash stop level has been determined, the microcomputer waits until the release button 11 is fully depressed. Upon full-depression of the release button 11, the projection amount of the taking lens 3 is adjusted similarly to the above. Then, the opening-and-closing operation of the shutter device 15 is performed in response to the shutter drive signal.

While the shutter device 15 is operated, the stop aperture formed by the shutter blade reaches the diameter corresponding to either of the set f-number and the predetermined f-number F11. At the moment that the stop aperture has reached the corresponding diameter, the synchro signal outputted from the shutter device 15 is inputted into the microcomputer 20. Upon this, the microcomputer 20 sends the flash start signal to the charge-and-discharge circuit 31 of the flash device. The flash discharge tube 16 starts to flash so that the flash light is emitted from the flash portion 8 toward the subject.

During the emission of the flash light, a part of the flash light reflected by the main subject enters the photographic film 22 through the taking lens 3 and the stop aperture to expose the photographic film. The exposure of the main subject is performed by the flash light in the state that the stop is more closed down than the aperture f-number.

A part of the reflected flash light is received by the light-regulation sensor 14 through the light-regulation window 9. On the basis of the photoelectric current flowing from the light-regulation sensor 14, the light amount is integrated by the light-regulation circuit 32. When the integrated amount reaches the flash stop level determined by the microcomputer 20, the flash light is stopped at that moment.

In the flash photographing, even if a picture is taken with the aperture f-number or the other f-number approximate thereto, the flash light is emitted in the state that the stop is more closed down than the aperture f-number. Thus, the main subject is photographed with the flash light in the good focus condition.

Figure 7:
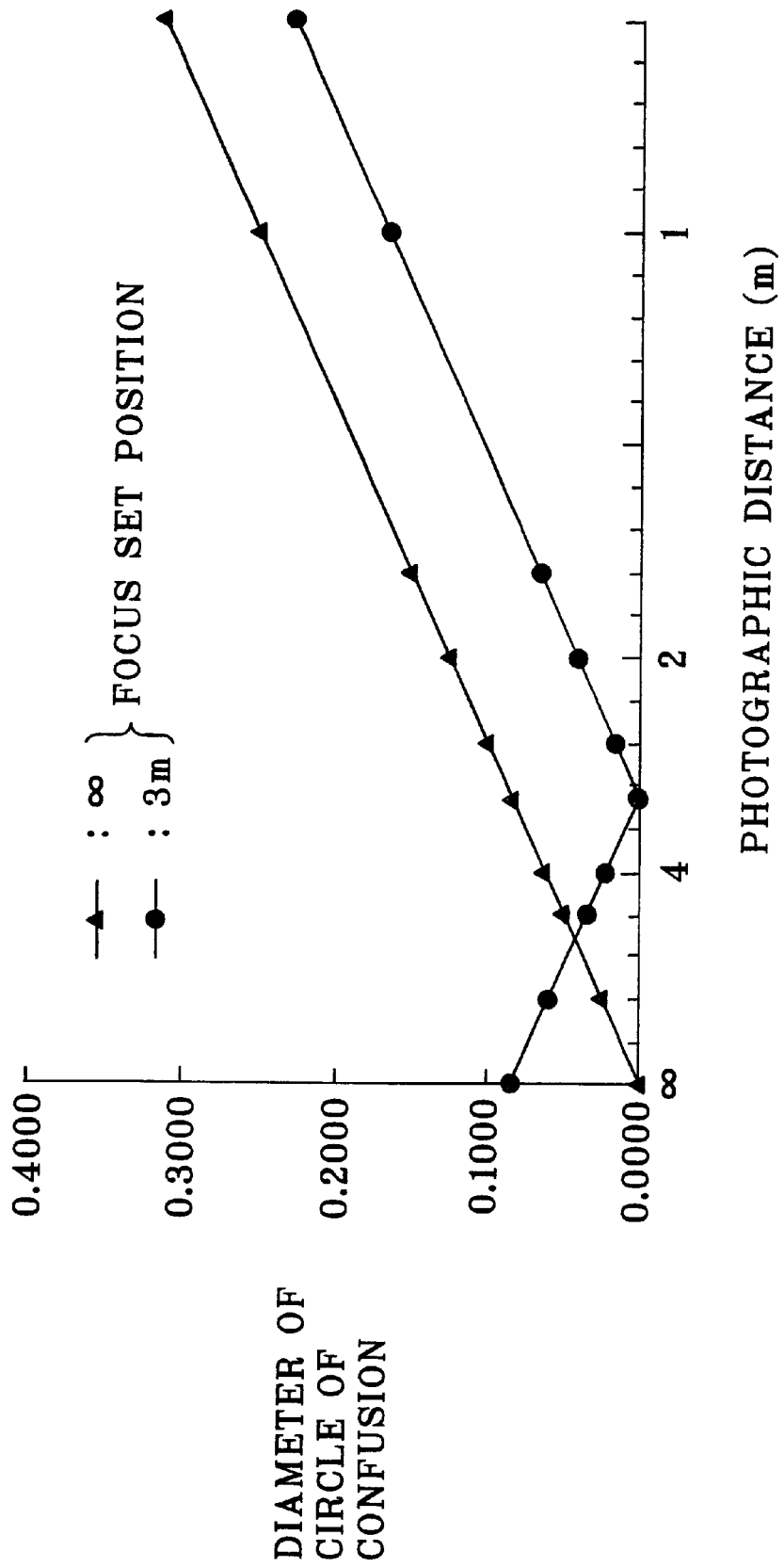
FIG. 7 is a graph showing diameters of circles of confusion on a photo print in conditions that focus set positions are 3 m and infinity.

FIG. 7 shows diameters of circles of confusion on a photo print in the case that the focus set position is adjusted to 3 m and the infinity. In FIG. 7, the diameter of the circle of confusion is calculated relative to each photographic distance on the following conditions. A focal length of the taking lens 3 is 28 mm, the f-number is F11 when photographing, and a print magnification (enlargement ratio) is 3.53 when the photo print is produced from the photographic film.

As will be understood from FIG. 7, when the focus set position is adjusted to 3 m, the diameter of the circle of confusion is less than 0.1 mm on the photo print within a range of about 1.5 m to the infinity so that a sharp image brought in focus is reproduced. By contrast, in the case that the focus set position is adjusted to the infinity, the diameter of the circle of confusion increases to deteriorate the focus condition when the photographic distance is less than 2 m.

FIG. 7 shows the diameter of the circle of confusion in the case that the f-number is F11. Although the diameter of the circle of confusion slightly increases when the f-number is more opened than F11 to some extent, the focus condition is kept in a comparatively good state.

Accordingly, when the above-described camera is loaded with the photographic film having high sensitivity of ISO 1000 or more, the main subject of comparatively short distance and the background thereof may be photographed on the good focus condition even in the photographic environment of the indoor and so forth.

In the above embodiment, when the photographic film of ISO 1000 or more is loaded, the upper limit of the focus set position is always fixed to 3 m. However, whether the upper limit of the focus set position is fixed or not may be determined in accordance with the f-number and the emission of the flash light.

Figure 8:
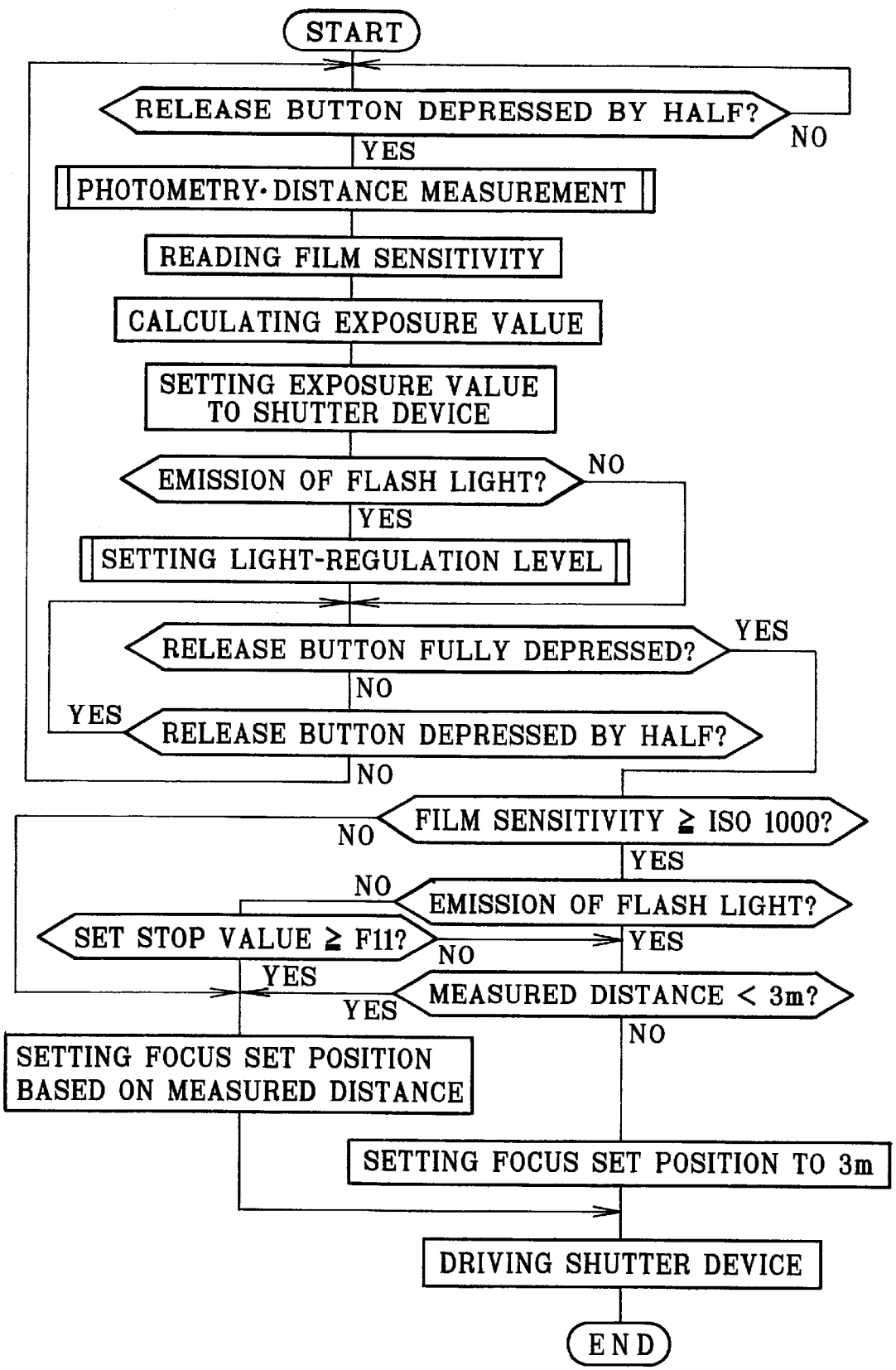
FIG. 8 is a flow chart showing an embodiment in that whether the focus set position is limited or not is determined in accordance with the f-number and emission of flash light.

FIG. 8 shows another embodiment in that setting of the upper limit of the focus set position is determined in accordance with the f-number and the emission of the flash light on condition that the photographic film of ISO 1000 or more is loaded. Incidentally, this embodiment is similar to the above embodiment except the following so that the component which is substantially similar to that of the above embodiment is denoted by the same reference numeral and the detailed description thereof is omitted.

In this embodiment, similarly to the above embodiment, the microcomputer 20 fixes the upper limit of the focus set position to 3 m without regard to the f-number when the photographic film of ISO 1000 or more is loaded and the flash light is emitted.

Meanwhile, when the photographic film of ISO 1000 or more is loaded and the flash light is not emitted, the upper limit of the focus set position is fixed to 3 m if the f-number is less than F11 (large stop). However, if the f-number is F11 or more (small stop), the projection amount of the taking lens 3 is adjusted so as to focus on the subject distance measured by the distance measurement unit 25.

In the case that the flash light is emitted, it is sufficient to include a flash available distance within the depth of field. In other words, it is sufficient to include a comparatively short distance within the depth of field. In this case, it is judged that the measurement result of the infinity, for example, is caused by a mistake of measuring. In view of this, when the flash light is emitted, the upper limit of the focus set position is fixed to 3 m for the purpose of minimizing the blur of the main subject.

By contrast, in the case that the flash light is not emitted, the photographic distance is sometimes adjusted to the infinity to photograph a landscape, and sometimes a short-distance subject is photographed. Thus, when the f-number is F11 or more, the limitation of the focus set position is removed and focusing is performed on the basis of the measurement result. Further, when the f-number is less than the F11, the upper limit of the focus set position is fixed to 3 m.

Figure 9:
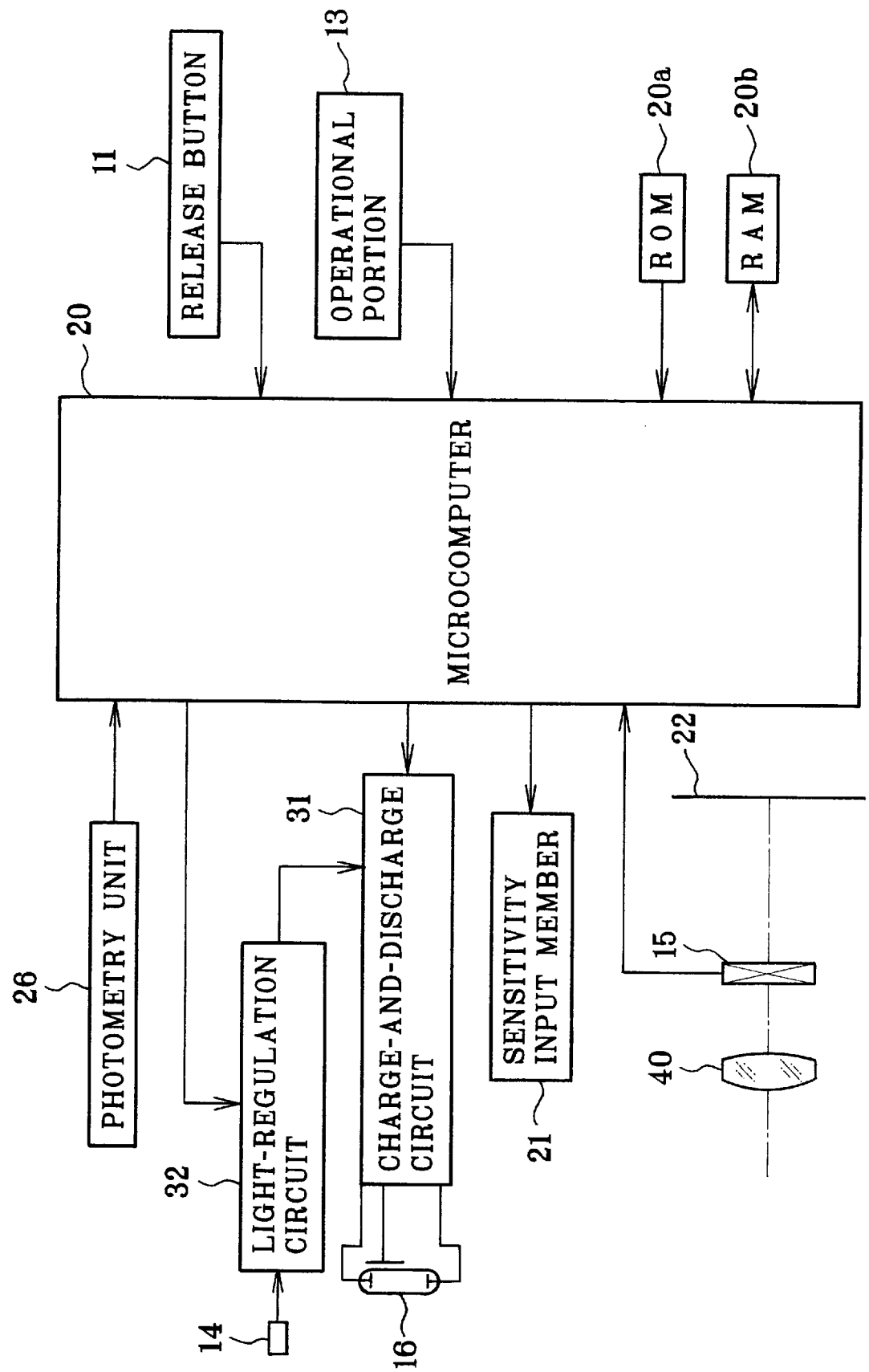
FIG. 9 is a block diagram partially showing a structure of a camera provided with a taking lens of a fixed-focus type.

FIG. 9 shows the other embodiment of the camera having a taking lens of a fixed-focus type. This embodiment is also similar to the first embodiment except the following so that a component which is substantially similar to that of the first embodiment is denoted by same reference numeral and the detailed description thereof is omitted.

The camera of this embodiment has the taking lens 40 of the fixed-focus type. In this camera, a subject distance is not measured and the projection amount of the taking lens 40 is not adjusted in accordance with the measured distance. The taking lens 40 is adapted to set a length for focusing, or the focus set position, to any position within a range of 1.0 m to 3.0 m. Although the taking lens 40 is the fixed-focus type, it is possible to obtain an effect similar to the first embodiment by setting the fixed focus set position to any position of the range of 1.0 m to 3.0 m.

Each of the above embodiments adopts the program shown in FIG. 3. In this program, when the exposure value is EV9 or more, the stop is continuously closed down as the exposure value increases, and at the same time, the shutter speed is shifted to the high-speed side. However, another program may be adopted to the shutter device if the condition of "$0.5 \leq (AV11-AV9)/(TV11-TV9) \leq 2.0$" is satisfied, and more preferably, the condition of "$0.7 \leq (AV11-AV9)/(TV11-TV9) \leq 1.5$" is satisfied.

Figure 10:
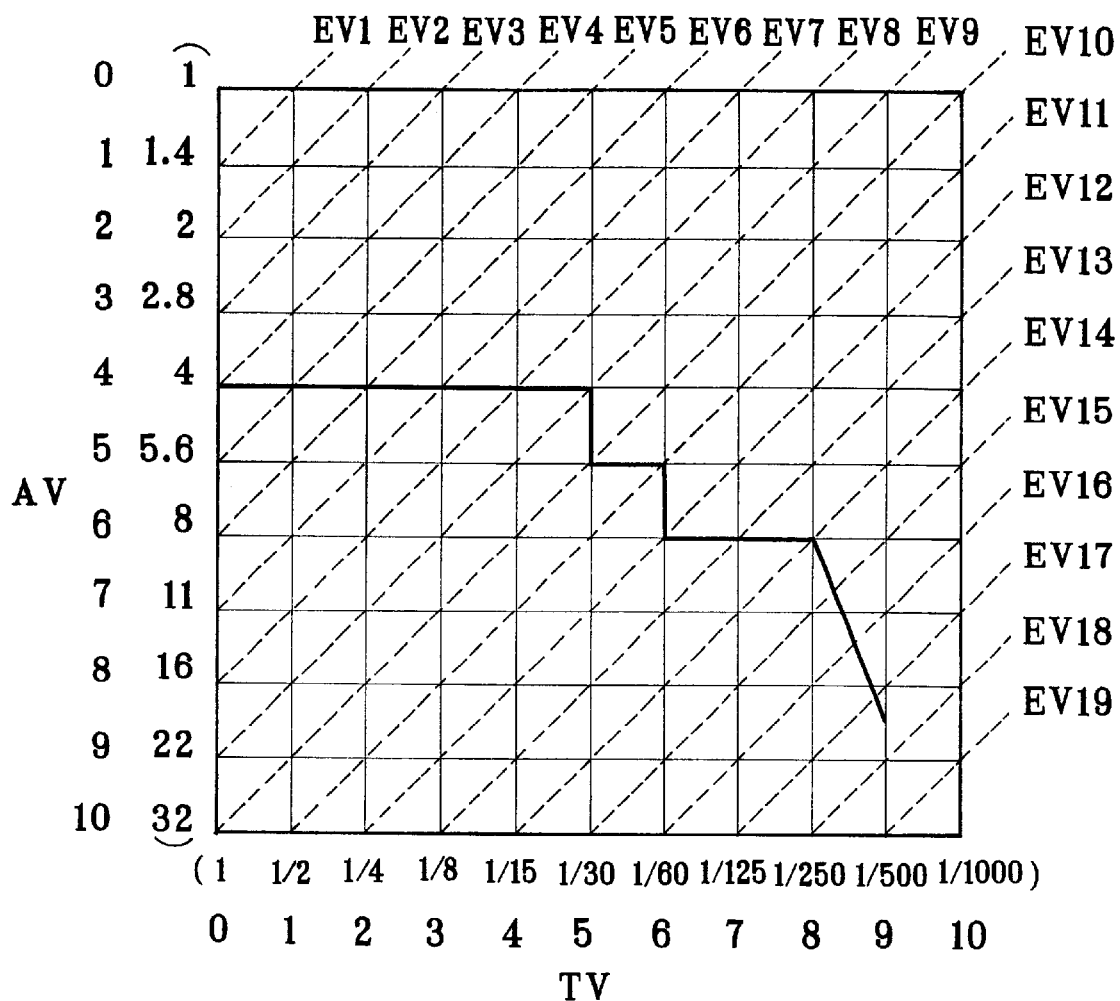
FIG. 10 is a program diagram showing another program of the shutter device.
Figure 11:
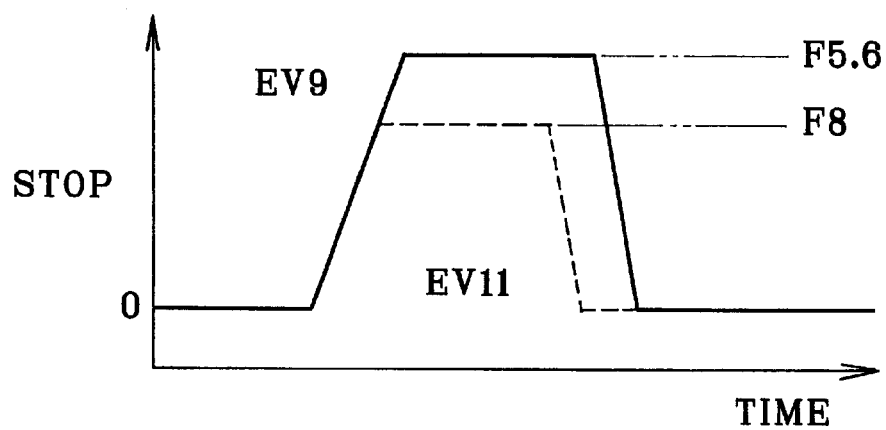
FIG. 11 is a graph showing the stop changes with respect to EV9 and EV11 in the embodiment shown in FIG. 9.
Figure 12:
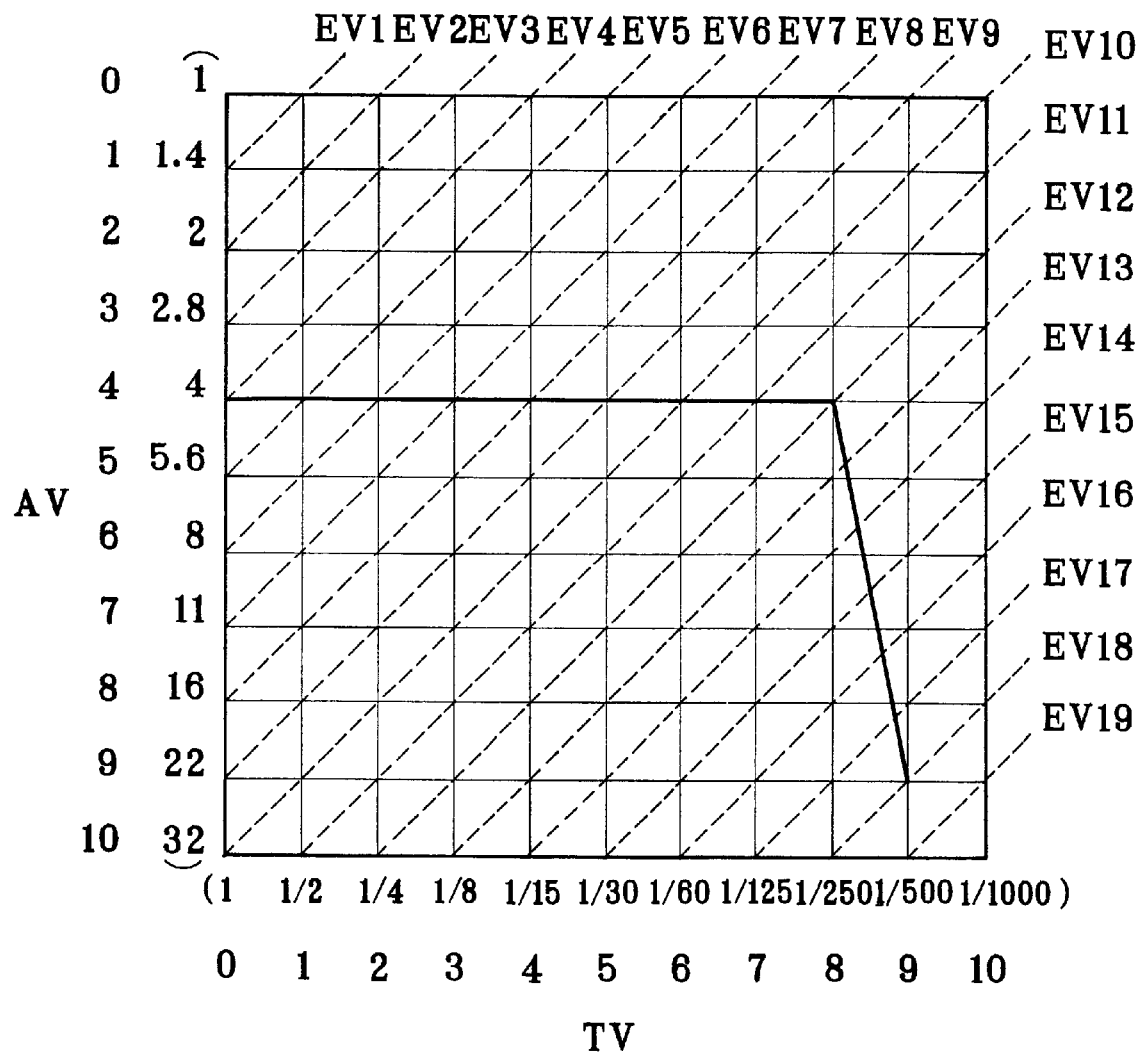
FIG. 12 is a program diagram showing a program of a conventional shutter device.

In a program shown in FIG. 10, when the exposure value increases from EV9 to EV10, the stop is closed down by one step without changing the shutter speed. Moreover, when the exposure value increases from EV10 to EV11, the shutter speed is shifted to the high-speed side by one step without changing the f-number. Further, when the exposure value increases from EV11 to EV12, the stop is closed down without changing the shutter speed. In this case, a value of (AV11−AV9)/(TV11−TV9) is "1". This kind of program may be realized by adjusting periods for keeping the diameters corresponding to the f-numbers of F5.6 and F8, such as shown in FIG. 11 for example.

In the above embodiments, the used flash device is the automatic type in which the flash light is controlled in accordance with the received light amount of the reflected flash light. However, it is possible to use a flash device of a flashmatic type in which the exposure amount obtained by the flash light is adjusted in accordance with a size of the stop aperture. Also in the case of the flashmatic type, the flash light is preferable to be emitted when the stop is more closed down than the aperture stop. Moreover, the light amount of the one-time flash light may be increased or decreased so as to obtain a proper exposure amount in a state that the stop is more closed down than the aperture stop.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera calculating an exposure value on the basis of measured subject brightness and film sensitivity of a loaded photographic film, wherein a combination of an f-number and a shutter speed is determined in accordance with said exposure value and said photographic film is exposed by using said combination, said camera comprising:

sensitivity distinction means for distinguishing said film sensitivity of said photographic film;

focus-position control means for limiting a length for focusing within a range of 3 m or less when the distinguished film sensitivity is ISO1000 or more; and a program shutter in which said combination is determined so as to satisfy the following condition, $$0.5 \leq (AV11-AV9)/(TV11-TV9) \leq 2.0$$

wherein AV9 is an apex value of the f-number to be set when the exposure value is EV9, TV9 is an apex value of the shutter speed to be set when the exposure value is EV9, AV11 is an apex value of the f-number to be set when the exposure value is EV11, and TV11 is an apex value of the shutter speed to be set when the exposure value is EV11.

2. A camera according to claim 1, further comprising:

a flash device for emitting a flash light, said flash device controlling an amount of the flash light such that an exposure amount for said photographic film becomes a predetermined amount.

3. A camera according to claim 1, further comprising:

a flash device for emitting a flash light, said flash device emitting the flash light in a state that a stop aperture formed by said program shutter is more closed down than an aperture-stop.

4. A camera according to claim 1, wherein said combination of said program shutter satisfies the following preferable condition $$0.7 \leq (AV11-AV9)/(TV11-TV9) \leq 1.5.$$

5. A camera according to claim 1, wherein said program shutter includes a shutter blade, which is opened and closed in accordance with the f-number and the shutter speed determined so as to correspond to said exposure value.

6. A camera according to claim 1, wherein said sensitivity distinction means reads a DX code provided on a film cassette containing said photographic film, when said photographic film is 135-type.

7. A camera according to claim 1, wherein said sensitivity distinction means reads a bar code of a data disk attached to a film cartridge containing said photographic film, when said photographic film is IX240-type.

8. A camera according to claim 1, wherein said sensitivity distinction means includes a switch externally operated to manually input said film sensitivity.

9. A camera calculating an exposure value on the basis of measured subject brightness and film sensitivity of a loaded photographic film, wherein a combination of an f-number and a shutter speed is determined in accordance with said exposure value and said photographic film is exposed by using said combination, said camera comprising:

a taking lens of a fixed-focus type having a length for focusing, which is set within a range of 1.0 m to 3.0 m; and a program shutter in which said combination is determined so as to satisfy the following condition, $$0.5 \leq (AV11-AV9)/(TV11-TV9) \leq 2.0$$

wherein AV9 is an apex value of the f-number to be set when the exposure value is EV9, TV9 is an apex value of the shutter speed to be set when the exposure value is EV9, AV11 is an apex value of the f-number to be set when the exposure value is EV11, and TV11 is an apex value of the shutter speed to be set when the exposure value is EV11.

10. A camera according to claim 9, further comprising:

a flash device for emitting a flash light, said flash device controlling an amount of the flash light such that an exposure amount for said photographic film becomes a predetermined amount.

11. A camera according to claim 9, further comprising:

a flash device for emitting a flash light, said flash device emitting the flash light in a state that a stop aperture formed by said program shutter is more closed down than an aperture-stop.

12. A camera according to claim 9, wherein said combination of said program shutter satisfies the following preferable condition.

$$0.7 \leq (AV11-AV9)/(TV11-TV9) \leq 1.5$$

13. A camera according to claim 9, wherein said program shutter includes a shutter blade, which is opened and closed in accordance with the f-number and the shutter speed determined so as to correspond to said exposure value.

* * * * *